UNITED STATES PATENT OFFICE.

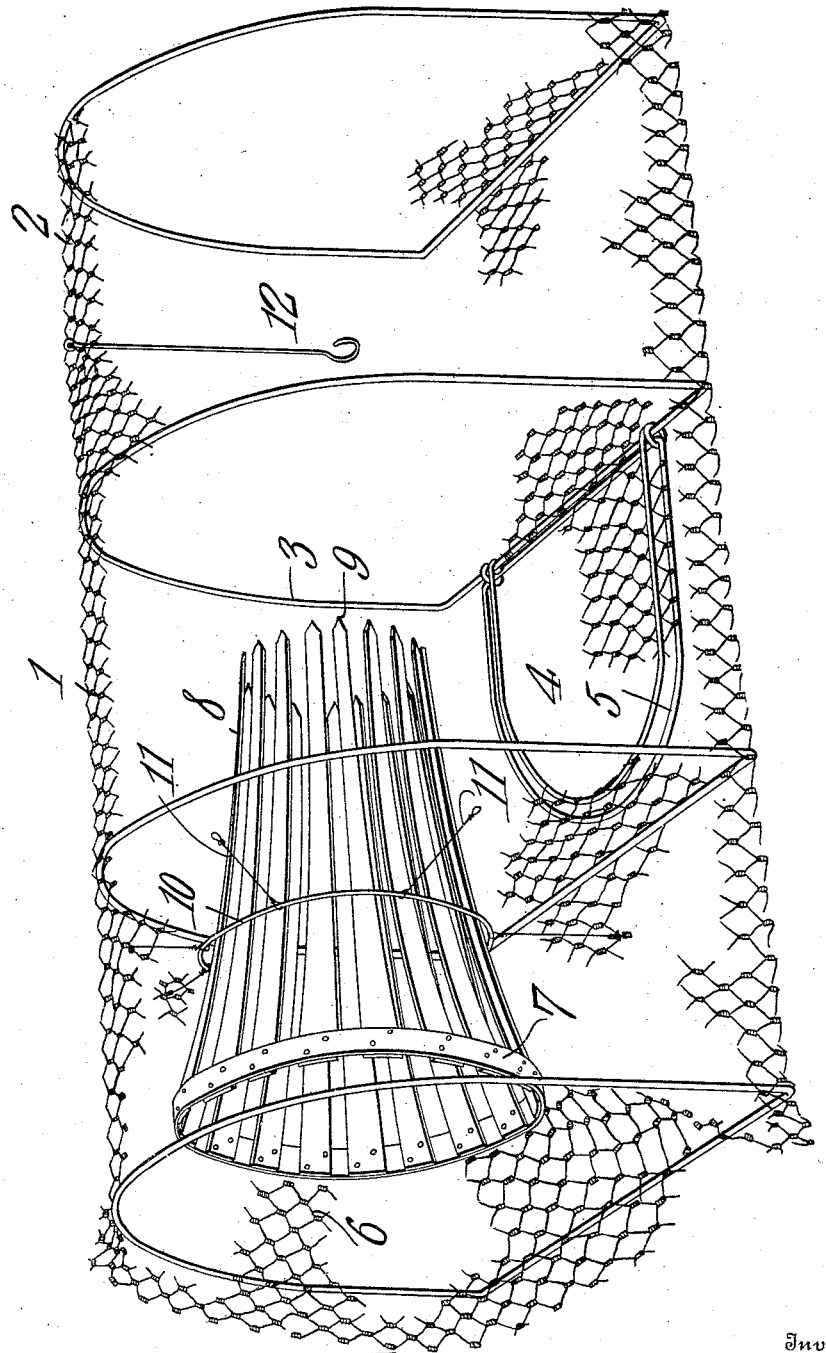

EUGENE B. CARWILE, OF ATLANTA, TEXAS.

FISH-TRAP.

No. 872,556.     Specification of Letters Patent.     Patented Dec. 3, 1907.

Application filed August 5, 1907. Serial No. 387,125.

*To all whom it may concern:*

Be it known that I, EUGENE B. CARWILE, a citizen of the United States, residing at Atlanta, in the county of Cass and State of Texas, have invented a new and useful Fish-Trap, of which the following is a specification.

This invention relates to fish traps and its object is to provide a device of this character which is simple, durable and efficient and which has novel means whereby fish can freely enter the cage of the trap but can not leave the same.

A still further object is to provide a plurality of retaining tongues having means whereby the movement thereof is limited to prevent egress of the fish.

With these and other objects in view the invention consists of certain novel features of construction and combinations of parts which will be hereinafter more fully described and pointed out in the claims.

In the accompanying drawing, which is a perspective view of the trap, the preferred form of the invention has been shown.

For the sake of clearness portions of the fabric of which the cage is formed have been removed.

Referring to the drawing by characters of reference, 1 designates a cage of any suitable contour and proportions, the same being preferably substantially semicylindrical and made up of wire fabric 2 arranged upon a skeleton frame 3 formed of heavy wires. The bottom of the trap may be provided with an opening 4 designed to be closed by a door 5 which may be hingedly connected to one of the sections of the frame 3. The front end of the cage extends inwardly as at 6 and is fastened to a metal hoop 7. Extending inwardly from this hoop is a series of elongated spring metal tongues 8 spaced apart and preferably tapered toward their inner ends, said ends being pointed as indicated at 9. A retaining ring 10 is located within the cage and surrounds the tongues, said ring being held in proper position by a plurality of brace wires 11 which radiate from the ring and are fastened at desired intervals to the cage. The tongues are formed preferably of very thin metal so that they can be readily pressed outward by a fish passing therebetween but these tongues are normally out of contact with the ring 10 and said ring is designed to limit their outward
movement. A bait hook 12 is preferably suspended within the cage directly in rear of the tongues 9 so that bait supported thereby will be plainly visible to fish in front of the trap.

It is thought that the operation of the device will be clearly apparent from the foregoing description when read in connection with the accompanying drawing. After bait has been placed in the trap and said trap has been submerged fish in an endeavor to reach the bait will be deflected into the hoop 7 by the frusto-conical end 6 of the cage and in passing through the cage they will press the light tongues 8 outward so that the fish can readily pass into the cage. As soon as the entrance has been effected the tongues 8 will re-assume their normal positions and prevent the escape of the fish. Should the fish attempt to pass outward through the inlet any lateral movement of the tongues will be limited by the ring 10. It will be noted that this ring not only serves to limit the movement of the fish but also holds the tongues properly centered within the cage.

What is claimed is:

1. In a trap the combination with a cage having an inwardly directed end wall provided with an inlet opening; of flexible converging tongues secured around the inlet and extending into the cage, and combined centering and retaining means loosely surrounding the tongues and supported within the cage.

2. In a trap the combination with a cage having an inwardly extending end wall; of a ring secured to the wall, flat metallic tongues secured to the ring and extending into the cage, said tongues converging, and a combined centering and retaining ring supported within the cage and surrounding the tongues.

3. In a trap the combination with a cage having an inwardly extending end wall; of a ring secured to said wall, flat metallic tongues secured to the ring and extending into the cage, said tongues converging, a combined centering and retaining ring surrounding the tongues, and radial supporting devices connecting the ring and cage.

4. A trap comprising a cage having an inwardly directed end wall provided with an inlet opening, a ring secured to said wall and around the opening, flat metallic tongues secured at one end to the ring and extending into the cage, said tongues being tapered and converging, a combined centering and retaining ring surrounding and normally spaced from the tongues, and radial devices connecting the ring and the cage.

In testimony that I claim the foregoing as my own, I have hereto affixed my signature in the presence of two witnesses.

EUGENE B. CARWILE.

Witnesses:
J. L. LOVELACE,
J. D. JOHNSON.